June 16, 1936.  H. C. WELTER  2,044,554
CONTACT CABLE TERMINAL
Filed June 13, 1931   2 Sheets-Sheet 1
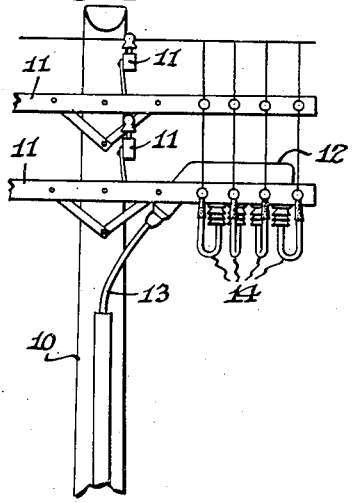
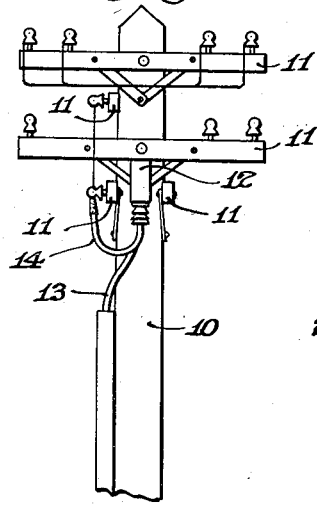
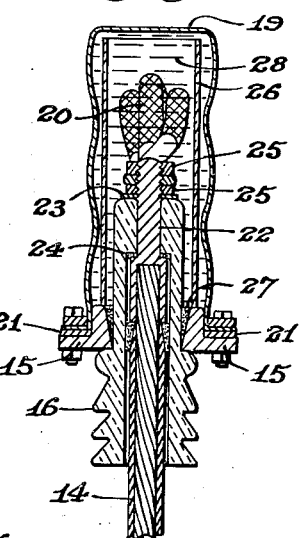
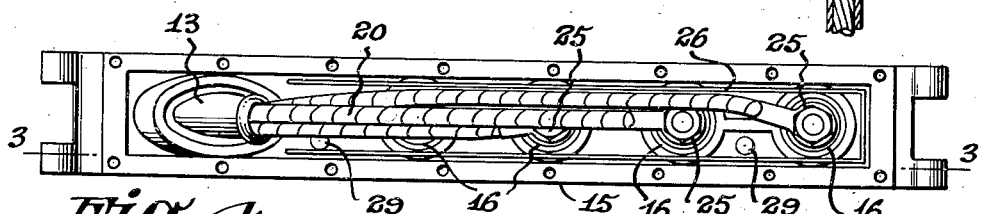
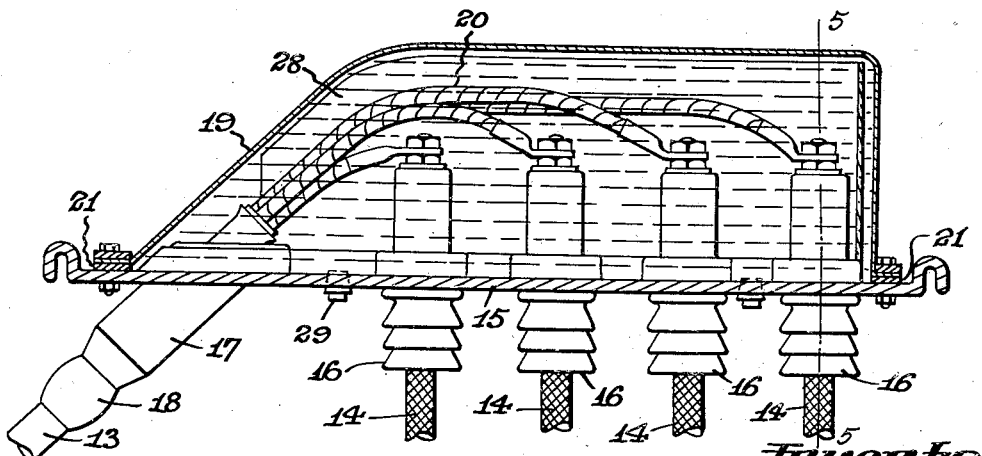
Inventor
Howard C. Welter
by Wilson, Mann & Cox
Attorneys

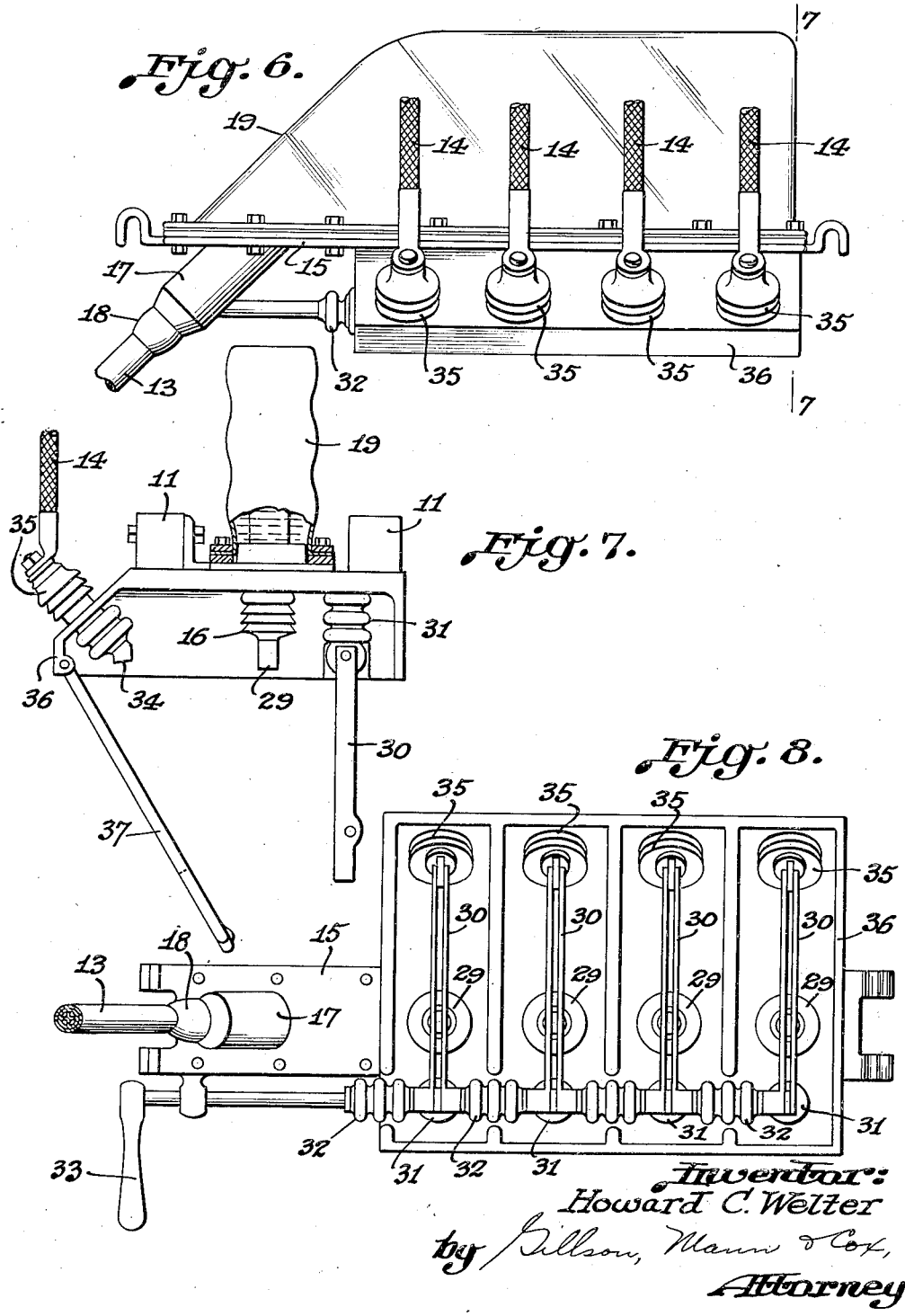

Patented June 16, 1936

2,044,554

UNITED STATES PATENT OFFICE 2,044,554

CONTACT CABLE TERMINAL

Howard C. Welter, Evanston, Ill.

Application June 13, 1931, Serial No. 544,096

3 Claims. (Cl. 247—7)

This invention relates to a novel contact cable terminal particularly adapted for connecting an underground power cable to an overhead conductor system, the primary object of which is to provide a positive protection against the ingress of moisture into the cable insulation.

Other and further objects, uses and advantages will become apparent as the disclosure proceeds and the description is read in conjunction with the accompanying drawings in which Fig. 1 is an elevational view of a contact cable terminal pole showing the main cable extending from the riser pipe housing to the contact cable terminal of this invention.

Fig. 2 is an end elevational view of this same contact cable terminal pole showing the contact cable terminal supported between two cross-arms.

Fig. 3 is side sectional view of the contact cable terminal taken on the line 3—3 of Fig. 4 with the hood attached.

Fig. 4 is a plan view of same with the hood removed.

Fig. 5 is an end sectional view taken on the line 5—5 of Fig. 3.

Fig. 6 is a side view of the contact cable terminal with a gang-operated disconnect assembly attached.

Fig. 7 is a sectional view of same taken on the line 7—7 of Fig. 6 showing the disconnect open.

Fig. 8 is a bottom view with the disconnect covers removed showing a gang-operated disconnect.

When an underground power cable is to be continued by an overhead conductor system it is necessary to properly insulate and seal the conductors of the power cable at the junction with the overhead open conductor system. The contact cable terminal is usually supported between two crossarms near the top of the pole where the connection is made to the overhead conductor system. This is generally accomplished by a contact cable terminal commonly referred to as a pothead in which the conductors protrude upward through insulator tubes with various gaskets throughout the assembly which are susceptible to the ingress of moisture.

In the present invention a contact cable terminal is substituted for the pothead referred to above which prevents any possible ingress or accumulation of moisture.

Referring now to Figures 1 and 2, there is shown side and end views, respectively, of a cable terminal pole 10 having crossarms 11, two of which carry the contact cable terminal generally designated 12 which receives the main power cable 13 and the leads 14 to the overhead conductor system.

The improved contact cable terminal 12 comprises a substantially flat elongated base 15, Figs. 3, 4 and 5, with openings to receive the insulator tubes or jackets 16 and an integral sleeve or conduit 17 through which the power cable enters, a lead wipe seal being made at 18. A hood or shield 19 completely covers the conductors and is sealed to the base 15 with a gasket 21 placed substantially below the upper ribs 15a of the base 15 so that any moisture that might have condensed within the assembly will be below the upward projecting portions of the insulator tubes or jackets 16 and the cable sleeve or conduit 17 as well as below the plane of the top of the connectors 22. The conductors 20 are electrically connected to the connectors 22 in the insulator tubes or jackets 16 and sealed thereto with gaskets 23 and 24 by tightening the nuts 25. The overhead conductor leads 14 are electrically connected to the connectors 22 and extend downwardly through the insulator tubes 16. An insulating barrier 26 is placed inside the hood or shield 19 along the sides and end to insulate the walls of the hood or shield 19 from the conductors 20, connectors 22 and nuts 25 in the event there should be any voids in the viscous insulating compound 28. No insulating barrier is needed at the top of the hood or shield 19 as sufficient space is allowed for safe operation and permits the easy filling of the hood or shield encasing the conductors 20 with the viscous insulating compound 28. This construction permits the hood or shield 19 to be made comparatively narrow thereby requiring only a minimum amount of insulating compound 28 and permitting the contact cable terminal 12 to be readily mounted between two cross-arms 11. The conductors 20 are insulated from each other with insulating tape. The insulator tubes or jackets 16 are tightly sealed to the base 15 preferably with a cement 27. The contact cable terminal 12 is completely filled with a suitable viscous insulating compound 28 through openings cut in the top of the hood or shield 19 after which they are sealed preferably with solder. The walls of the hood or shield 19 are preferably made of sheet metal sufficiently thin and curved to make them readily yieldable to any change in volume of the insulating compound 28 as might be caused by temperature changes. This construction relieves the seal between the base 15 and the hood or shield 19 from any undue pressures that might occur with a rigid case, making it unnecessary to leave gas pockets in the insulating compound 28. Plugs 29 permit draining the compound 28 when necessary.

Referring now to Figs. 6, 7 and 8, the contact cable terminal is shown with a gang-operated disconnecting switch for providing a quick means of opening or closing the connection between the main cable 13 and the conductors 14 of the overhead conductor system. Connector 22 of Fig. 5 is replaced with a longer contact connector 29 which serves as a switch contact. The switch blades 30 are supported on insulated supports 31 and interconnected with insulators 32 forming a rigid gang-operated knife switch with operating handle 33 serving to open and close the electrical circuit between contact connectors 34 and 29. Contact connector 34 is electrically connected to the overhead conductors 14 and insulated from the case 36 by insulators 35. When the switch blades 30 are in an open position, as indicated in Fig. 7, they are insulated from contact connector 34 and 29. The cover 37 is closed after switching operations protecting the exposed connections.

To assemble the contact cable terminal the cable sleeve 17 is cut to fit the main cable 13 and the hood or shield 19 is removed after which the base 15 is placed into position over the cable 13 and supported on the crossarms 11. The lead sheath of the cable 13 is then removed to a point slightly above the base 15 after which the conductors 20 are cut to length and electrically connected to the connectors 22 containing the overhead conductor 14. All parts are accessible during this operation. After properly taping the conductors, the insulating barrier 26 is placed around the conductors and the hood or shield 19 installed and sealed to the base 15. The insulating compound 28 is then poured into the assembly 12 and the openings through which it was poured sealed with solder.

This construction makes all the parts during assembly accessible which insures a workmanlike job and allows close inspection of the work all at a reduced labor cost. The contact cable terminal permits the main cable housing or riser pipe to be brought nearer the cable terminal thereby exposing less cable and reducing the necessary taping and fireproofing of the exposed section to a minimum. The insulating compound 28 can be drained through the plugs 29 and the hood or shield removed permitting inspection of the conductors and equipment without disturbing the electrical connections.

It will be understood that these specific illustrations and the corresponding specific description of the contact cable terminal is for the purpose of disclosure only, for it is realized that various changes and modifications can be made without departing from the spirit of this invention.

What I claim, therefore, is:

1. A contact terminal for a power cable comprising in combination a substantially flat elongated base, a plurality of aligned connectors mounted on the base but insulated therefrom, a shield completely covering the connectors having a weatherproof joint with the base, means on the base for introducing the cable terminal into the closed space and supporting it in place, conductors protruding from the cable electrically connected to the several connectors, a viscous insulator filling the closed space and an insulating barrier interposed between the connectors and the side walls of the shield.

2. A contact terminal for a power cable comprising in combination a substantially flat base, a connector mounted on the base but insulated therefrom, a yieldable shield completely covering the connector having a weather-proof seal with the base, means on the base for introducing the cable terminal into the closed space and supporting it in place, a conductor protruding from the cable electrically connected to the connector, and a viscous insulator filling the closed space, said yieldable shield permitting expansion and contraction of the viscous material without danger of rupturing the seal.

3. A contact terminal for a power cable comprising in combination a base, a connector extending through the base, a jacket insulating the connector from the base, a shield adapted to cover the connector and jacket having a weather-proof seal with a base, means for introducing the power cable through the base and connecting it with said connecter, a viscous insulating material filling the space between the shield and the base and an insulating barrier interposed between the connector and the shield.

HOWARD C. WELTER.